C. A. WESTERBERG.
BASE FOR HOLDERS FOR MEASURING BLOCKS.
APPLICATION FILED MAR. 10, 1920.

1,397,189.

Patented Nov. 15, 1921.

UNITED STATES PATENT OFFICE.

CARL AXEL WESTERBERG, OF ESKILSTUNA, SWEDEN, ASSIGNOR TO AKTIEBOLAGET C. E. JOHANSSON, OF ESKILSTUNA, SWEDEN, A MANUFACTURING COMPANY OF SWEDEN.

BASE FOR HOLDERS FOR MEASURING-BLOCKS.

1,397,189.   Specification of Letters Patent.   Patented Nov. 15, 1921.

Application filed March 10, 1920. Serial No. 364,700.

*To all whom it may concern:*

Be it known that I, CARL AXEL WESTERBERG, a subject of the King of Sweden, residing at Eskilstuna, in the Kingdom of Sweden, have invented a new and useful Improvement in Bases for Holders for Measuring-Blocks, of which the following is a specification.

The present invention relates to a base for such holders for parallel end gages, or so called measuring blocks, which consist of a frame into which the blocks may be inserted and retained by means of a clamping screw or the like. The invention has for its purpose to provide such an arrangement of the base and its connection with the holder that the latter together with one or several blocks and a marking tool inserted into the same may be used with advantage as a surface gage for tracing marking or scratch lines at definite distances from a surface plate. For small distances it is only necessary to place the marking tool on a bed or support of measuring blocks, after which it is possible safely to move the whole combination over the surface plate so that a correct marking line is obtained. On the other hand, this method is exceedingly hazardous for greater distances, on account of the fact that the bearing surface of the combination of measuring blocks against the surface plate is so small that there will be vibrations during the movement. This difficulty may be avoided, however, by clamping the measuring blocks and the marking tool in a holder, for instance of the construction described in the Swedish Patent No. 27,355, and by attaching the holder to a base the bottom surface of which is sufficiently large for providing a steady movement over a surface plate. It is, however, a necessary condition that the distance between the bottom surface of the base and the lowermost measuring block in the holder is perfectly fixed. This condition is fulfilled in the base forming the subject of the present invention.

For this purpose the novel base is provided with an arm having two plane surfaces parallel with each other and with the bottom surface of the base, said arm being adapted to be introduced into the holder frame and to be clamped into said frame in such manner that said arm bears directly against the undermost of the measuring blocks in said holder. The distance between the bottom surface of the base and the upper surface of the arm parallel therewith being fixed and known, it will be seen that the lowermost measuring block in the holder will be located at a fixed distance from a surface plate on which the base is placed, the purpose aimed at thus being attained.

An embodiment of the invention is illustrated in the accompanying drawing by way of example. Figure 1 shows a base according to the invention supporting a holder with measuring blocks inserted therein, the base being shown in longitudinal section. Fig. 2 shows a side elevation of the base. Fig. 3 shows a plan view and Fig. 4 an end view of the same. Fig. 5 shows the arm viewed from above.

Referring to the drawing, 1 denotes the holder and 2 the base which consists of an elongated piece of cast iron or other suitable material. The base is provided at one end with a cut or recess 3 adapted to receive the lower end of the holder 1, and on the upper side the base is provided with a groove 4 into which the arm 5, which in the embodiment illustrated is made as a separate piece, is inserted and secured by means of two screws 6. The arm 5 is provided with two plane surfaces 7 and 8 parallel with one another, and is secured to the base in such manner that said surfaces are also precisely parallel with the bottom surface 9 of the base. The width of the arm is selected in such manner that the part of the arm projecting over the recess 3 may be introduced into the holder 1, as shown in Fig. 1. Besides, there are introduced into the holder above the arm a few measuring blocks 10 of different dimensions, and uppermost a marking tool 11 provided with a sharp point located exactly in the lower surface of said tool. All these parts 5, 10, and 11 are clamped in the holder by means of a clamp screw 12. In the bottom of the recess 3 there is provided a spring 13 which, in the embodiment illustrated, is secured by means of one of the screws 6 and serves to force the holder 1 pushed onto the arm 5 upward against said arm, so that the holder is maintained in the proper position relatively to said arm and the base, even if the clamp screw 12 has not been tightened.

When it is desired by means of the arrangement described to trace a marking line on a piece of work at a fixed distance $a$ from the bottom surface of said piece, the piece is placed on a surface plate 14 on which the base 2 is also placed. The holder 1 is afterward pushed onto the arm 5 and is initially retained by the spring 13. The distance $b$ between the plane upper surface 7 of the arm and the bottom surface 9 of the base being known, it is only necessary by means of suitable measuring blocks to combine a measure or gage $c$ equal to the difference between $a$ and $b$, and afterward to introduce said combination of blocks as well as the marking tool 11 into the holder above the arm 5. Finally, the clamping screw 12 is tightened which then holds together, not only the measuring blocks and the marking tool, but also the holder and the base, the arm 5 rigidly secured with the base being also introduced into the holder. It is then only necessary to move the marking tool up against the working piece and to slide the base over the surface plate, which is easily made without danger of vibration, on account of the large bearing surface of the base 2 against the surface plate.

The embodiment illustrated may of course be modified in several respects without departing from the principle of the invention. It is thus not necessary, for instance, to make the arm 5 as a separate part, although this construction will be preferred in the practice, as the other portion of the base may then be made of a less expensive material than the arm, and the possibility of inserting, if desired, arms of different heights in the same base is also attained.

I claim:

1. The combination with a base for holders for measuring blocks, said base having a recess at one end and a groove in its upper side, of an arm having two parallel plane surfaces and secured in said groove in the base in such manner that the parallel plane surfaces on said arm are parallel with the bottom surface of the base and overhang said recess.

2. The combination with a base for holders for measuring blocks, said base having an arm provided with two plane surfaces parallel with one another and with the bottom surface of the base, of a holder adapted to receive the end of said arm, at least one measuring block inserted into said holder so as to bear against said arm, and clamping means in said holder for retaining said arm and said measuring block in said holder.

3. The combination with a base for holders for measuring blocks, said base having a recess at one end and a groove in its upper side, of an arm having two parallel plane surfaces and secured in said groove in the base in such manner that the parallel plane surfaces on said arm are parallel with the bottom surface of the base, of a holder adapted to receive the end of said arm, at least one measuring block inserted into said holder so as to bear against said arm, and clamping means in said holder for retaining said arm and said measuring block in said holder.

4. The combination with a base for holders for measuring blocks, said base having a recess at one end and a groove in its upper side, of an arm having two parallel plane surfaces and secured in said groove in the base in such manner that the parallel plane surfaces on said arm are parallel with the bottom surface of the base and having one end projecting over said recess, of a holder adapted to receive said end of said arm, at least one measuring block inserted into said holder so as to bear against said arm, clamping means in said holder for retaining said arm and said measuring block in said holder, and a spring located in said recess in the base and secured to said base and adapted to maintain said holder in engagement with said arm.

CARL AXEL WESTERBERG.